(No Model.)
F. R. HOGEBOOM.
TREE PROTECTOR.
No. 293,463. Patented Feb. 12, 1884.
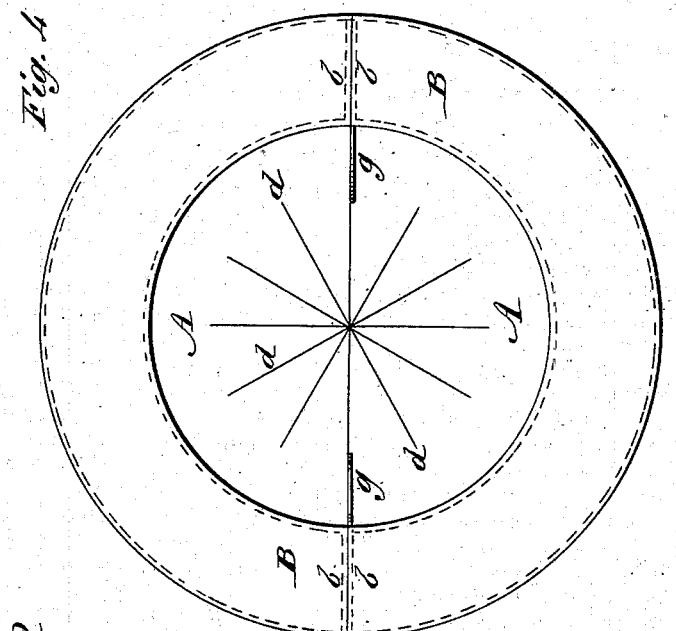
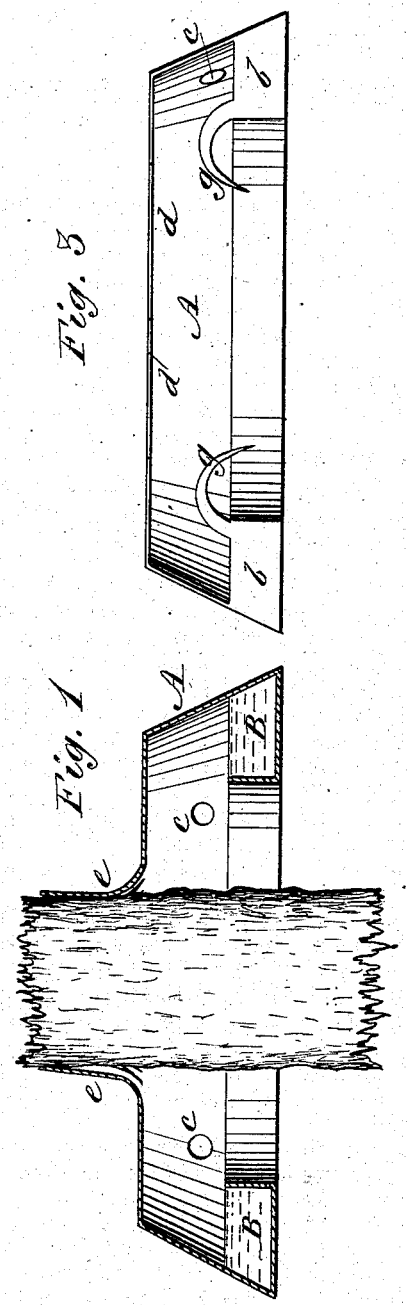
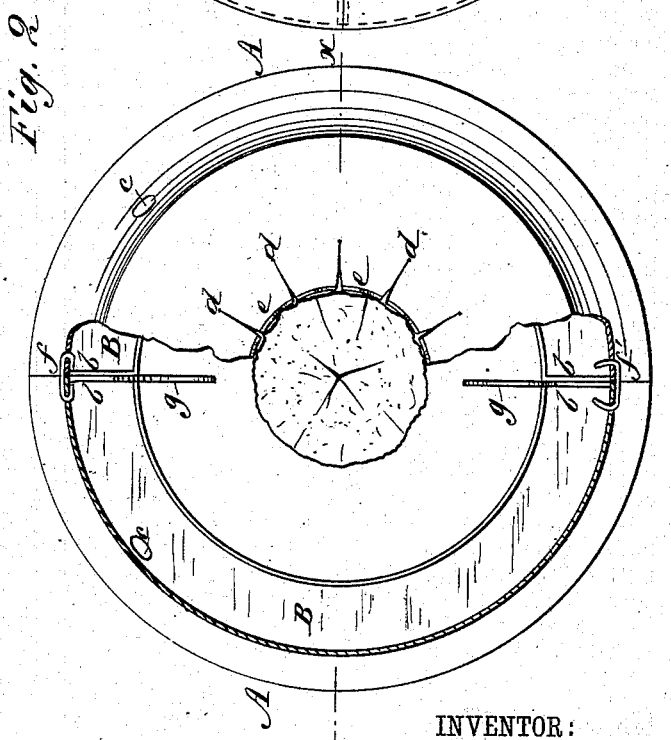
WITNESSES:
C. Neveux
C. Sedgwick
INVENTOR:
F. R. Hogeboom
BY Munn & Co
ATTORNEYS.
N. PETERS. Photo-Lithographer, Washington, D. C.

UNITED STATES PATENT OFFICE.

FRANKLIN R. HOGEBOOM, OF BROOKLYN, NEW YORK.

TREE-PROTECTOR.

SPECIFICATION forming part of Letters Patent No. 293,463, dated February 12, 1884.

Application filed November 8, 1883. (No model.)

*To all whom it may concern:*

Be it known that I, FRANKLIN R. HOGEBOOM, of Brooklyn, in the county of Kings and State of New York, have invented certain new and useful Improvements in Tree-Protectors, of which the following is a full, clear, and exact description.

This invention relates to that description of portable and removable tree-protectors used to protect trees from the ravages of caterpillars and other insects, which are made to encircle the trunk of the tree at a distance from the ground, and are constructed with an encircling-trough at their base, of larger diameter than the trunk, for holding kerosene or other oil or insect-destroying fluid, the whole being made in sections or halves, to provide for the attachment and removal of the protector.

My invention consists of the detailed construction and combination of parts, substantially as hereinafter described.

Reference is to be had to the accompanying drawings, forming a part of this specification, in which similar letters of reference indicate corresponding parts in all the figures.

Figure 1 represents a vertical section of my improved tree-protector on the line $x\ x$ in Fig. 2, showing the same as applied to the trunk of a tree. Fig. 2 is a partly-sectional plan view of the same; Fig. 3, an elevation of one-half of the protector, as seen from its inside, before its upper central cut portions are turned upward to hug and close upon the tree; and Fig. 4, an inverted plan of the whole device under a similar condition of its upper cut portions.

A A are the two sections or halves of the body of the protector, made of sheet metal, preferably in the form of a hollow truncated cone, having a closed top and open base. Each of these sections is constructed or provided with an interior semi-annular trough or trough-section, B, closed at their meeting ends $b$, and into which the oil is poured through orifices $c$, which may be afterward closed. The closed top of this sectionally-constructed protector has central radial cuts, $d$, made in it, and the cut portions so formed in each section are bent upward and outward to form elastic or flexible flaps $e$, which hug and close around the tree and serve to support the protector, and between which and the tree any soft material may be introduced to form a close joint and prevent the passage of insects. The two sections A A, with their attached semi-annular troughs B, which combined are of much larger diameter than the tree, are or may be united by simple staples or pieces of wire $f f'$, the one of which, $f$, may be bent to form a permanent hinge for holding the sections together when putting the protector on and off the tree, while the other staple, $f'$, may be shaped so that it can be readily drawn out or inserted when opening or closing the protector. The trough-sections being closed at their meeting ends $b$, no packing is required at such joint, and the construction of the upper part of the protector, as described, dispenses with any necessity for a hood and separate spring to close the same about the tree. Drop attachments $g\ g$, of hook-like shape, are formed in or on the end portions, $b$, of either trough-section, the same curving upward and inward from the inner edge of the trough toward the tree, to provide for such insects or caterpillars as do not fall into the oil in the trough, but crawl around the inner upper edge of the trough, passing up and over said drop attachments, and so falling back again to the ground.

The protector may be fastened firmly to the tree by an encircling-wire. In applying the protector to the tree, the flexible flaps $e\ e$ should be turned up to conform to the size of the tree, and the length of such turned-up portion be adjusted from time to time as the tree grows, thus making the same protector answer for varying diameters of the same tree or for trees of different girth.

Having thus described my invention, I claim as new and desire to secure by Letters Patent—

In a tree-protector, the combination of the semicircular sections having corresponding troughs, B, with their ends $b\ b$, provided with hooks $g$, curved upward and downward and terminating intact with the tree, essentially as shown and described, and for the purpose set forth.

FRANKLIN R. HOGEBOOM.

Witnesses:
EDGAR TATE,
C. SEDGWICK.